W. F. FOLMER.
PHOTOGRAPHIC SHUTTER MECHANISM.
APPLICATION FILED OCT. 25, 1915.

1,266,443.

Patented May 14, 1918.
2 SHEETS—SHEET 1.

WITNESSES:

INVENTOR.
William F. Folmer
BY
HIS ATTORNEYS.

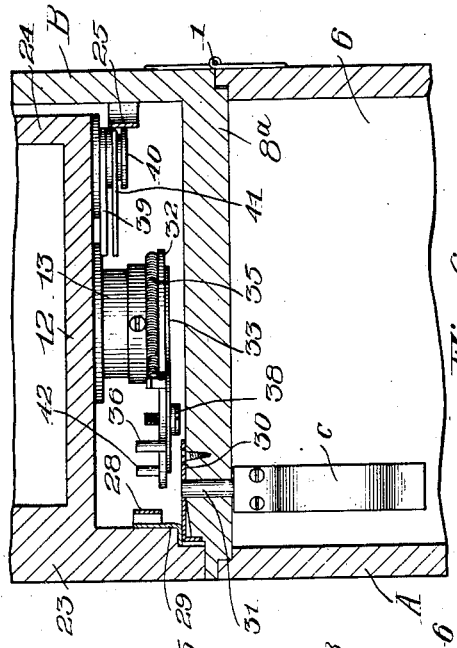

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-SHUTTER MECHANISM.

1,266,443.   Specification of Letters Patent.   Patented May 14, 1918.

Application filed October 25, 1915. Serial No. 57,666.

*To all whom it may concern:*

Be it known that I, WILLIAM F. FOLMER, of Rochester, in the county of Monroe and State of New York, have invented certain new and useful Improvements in Photographic-Shutter Mechanism; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide a simple and efficient shutter mechanism therefor that will be positive in its operation and will last well under hard usage. A further object of the invention is to provide shutter mechanism particularly adapted for use in a camera designed for the purpose of making photographic records of gas and electric meter readings and for use in conjunction with film feeding mechanism such as described and claimed in my companion application Serial No. 57,665; filed October 25, 1915. The improvements are directed in part toward combining the shutter mechanism with an electric switch mechanism whereby the object illuminating devices of the camera come under the control of the shutter mechanism. To these and other ends the invention resides in certain improvements and combinations of parts all as will be hereinafter more fully described, the novel features being pointed out in the claims at the end of the specification.

In the drawings:

Fig. 3 is an enlarged but fragmentary transverse section taken substantially on the line 3—3 of Fig. 2 showing the shutter mechanism in front elevation;

Fig. 4 is a view similar to Fig. 3 but showing the parts in a different position;

Fig. 5 is a detail fragmentary section taken substantially on the line 5—5 of Fig. 3 to show certain parts of the circuit arrangement, and Fig. 6 is a detail fragmentary section taken substantially on the line 6—6 of Fig. 3 for the same purpose.

Similar reference numerals throughout the several figures indicate the same parts.

Figure 1:
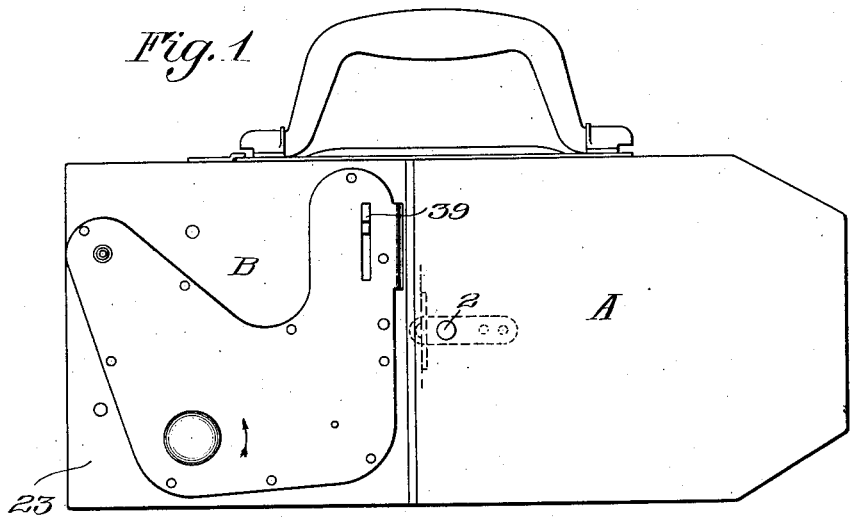
Figure 1 is a side elevation of a camera constructed in accordance with and illustrating one embodiment of my invention.
Figure 2:
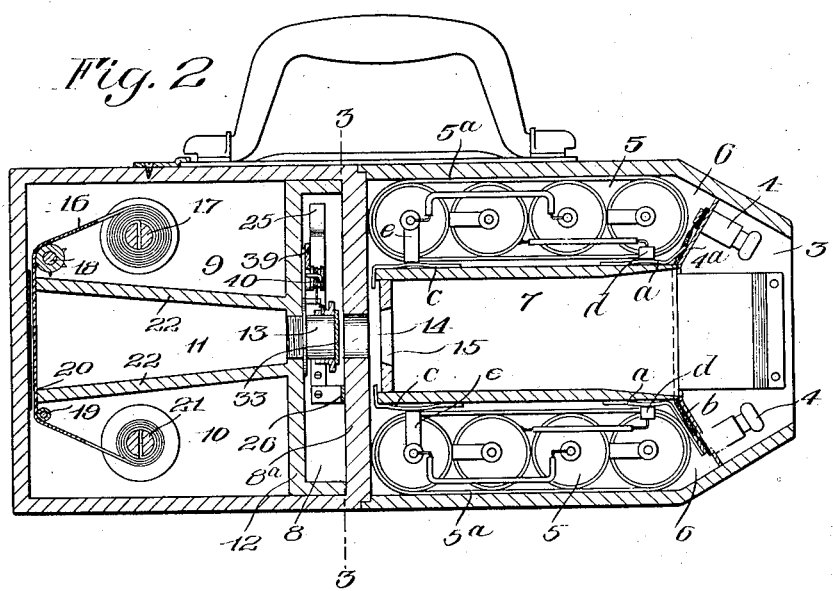
Fig. 2 is a central vertical section therethrough.

The construction and general purposes of the camera as a whole will first be described. The body thereof is divided at or near the center into two casings A and B separable along the joint indicated at 1 to give access to the interior of the casing A at the rear thereof and held together by a suitable catch 2. At the front of section A is a light chamber 3 containing object illuminating devices 4 in the present form of electric lamps. In use, the open front of the camera is laid close against the face of the meter so that the latter is practically in the chamber 3 and brilliantly illuminated by the lamps 4. These lamps are supplied through a circuit leading from batteries 5 occupying upper and lower chambers 6 in case A on opposite sides of a light passage 7 leading rearwardly from the light chamber 3. The complete circuit cannot be given at this point in the description but so far as it is comprised within the front casing A it comprises a contact *a* at the front of each chamber 6 connected to one terminal of the lamps 4 and the lamp carrying plate 4ª, respectively, the first terminals of the lamps being connected by a wire *b*, and contact plates *c* at the rear ends of the respective chambers. The batteries in each chamber are carried in a removable casing 5ª and connected up together in the manner clearly shown or in any preferred way and the terminals *d* and *e* thereof connect with the contacts *a* and *c*, respectively, when the containers are in place in the chambers 6. The latter are accessible from the rear of the casing A for the insertion and removal of the batteries when the casing B is separated therefrom.

The casing B contains a shutter chamber 8 in rear of its front wall 8ª, two film chambers 9 and 10 and an intermediate exposure or dark chamber 11. A partition 12 forming the front walls of the chambers 9, 10 and 11 carries the lens tube 13 in alinement with the exposure chamber 11 and the light passage 7 with which latter it communicates through an opening 14 in the front wall of section B and an opening 15 in a partition at the rear of passage 7. The film 16 is fed from a supply spool 17 over rolls 18 and 19 through the focal plane adjacent the exposure opening 20 at the rear of the chamber 11 to a winding or take-up spool 21 arranged in the lower chamber 10. The partitions 22 separating the chambers 9, 10 and 11 and the partition 12 connecting them are all carried with one of the side walls 23 of the casing B and are withdrawn from the latter by taking off this side wall. There is a wall 24 opposite to this side wall closing the other ends of the chambers which also comes out and helps to support the spools 17 and 21 and the rollers 18 and 19 so that all of these parts together with the lens tube 13 and the shutter mechanism to be hereinafter described are carried by the removable structure and the casing B is merely a box containing the latter.

There is a spring contact finger 25 on an inner wall of the casing B connected with a metal strip 26 (Figs. 5 and 6) terminating in a contact 27 extending through the front wall 8ᵃ of casing B and engaging contact c when the two casings are pressed together while a spring contact arm 28 (Figs. 3 and 5) on the removable wall 23 is connected by a strap 29, when the wall is in place, to a strap 30 joined to a contact 31 also extending through the front casing wall 8ᵃ and engaging the other contact c in the front casing. It will be seen from this that an electrical connection between the two contact arms 25 and 28 will close the circuit through the batteries and lamps and energize the latter. Such completion of the circuit is established through the shutter mechanism which will now be described.

Referring more particularly to Figs. 3 and 4, there is carried by the lens tube 13 a fixed plate 32 upon which is pivoted at 34 a shutter leaf 33 that normally covers the end of the lens tube by reason of its own weight and the action of a spring 35. On the far side of its pivot, the leaf is provided with a laterally projecting pin 36 adapted to be engaged by a link 37 pivoted at 38 to an operating lever 39 pivoted at 40 to the partition 12. A spring 41 normally holds the operating lever in raised position while a spring 44 normally holds an arm 46 on the link 37 against a lip 45 on the operating lever 39 and maintains the link in proper position to engage the pin 36 when the lever is depressed. Such engagement raises or opens the shutter leaf 33 which is later allowed to close by reason of the cam engaging face 47 on the link slipping off of the projection 36 after it comes into contact with a fixed pin or abutment 42 on an extension 43 of the plate 32. This position is shown in Fig. 4, the shutter having already closed and the operating lever 39 being in its extreme depressed position. As the lever 39 returns, a lateral cam face 48 on the link 37 rides against the projection 36 but the force of its spring 44 is exerted in such a direction by reason of the engagement being with another side of the projection 36 that the tendency is to close rather than open the shutter leaf. When the cam surface 48 clears the projection, the arm 46 goes back into engagement with the lip 45, as shown in Fig. 3, and the link is again in normal position ready for a subsequent operation of the shutter.

When the structure within the casing B is assembled therewith, the pivot 40 of the shutter operating lever 39 makes connection with the spring contact 25, as shown in Figs. 3 and 5 and the strap 29 from the spring contact 28 makes connection with the strap 30 and contact 31 as previously explained. Thus, the break in the electrical circuit is between the operating lever 39 and the spring contact 28 and these parts act as a switch. When the lever 39 is depressed to actuate the shutter, the lip 45 thereon rides against the contact 28 and closes the circuit and as it will be seen that the engaging face of the contact arm 28 is relatively long, the contact is maintained both during the opening of the shutter leaf 33 and during the interval that it is held open. A sustained illumination of the object by means of the lamps 4 is therefore assured and the length of the exposure may be regulated by the rapidity with which the stroke of the operating lever 39 is made, though after the shutter has closed, the contact is immediately broken as is shown by Fig. 4.

The shutter mechanism will be seen to be of simple and substantial construction and positive in its action and well adapted to withstand hard and constant usage.

I claim as my invention:

1. In a photographic camera, the combination with an object illuminating means, an electric circuit including the same and a contact surface in said circuit, of a shutter and a shutter operating member also in the circuit and normally out of engagement with the contact the operative throw of which member brushes it across the contact and out of engagement therewith on the opposite side.

2. In a photographic camera, the combination with an object illuminating means, an electric circuit including the same and a contact member in said circuit, of a shutter and a shutter operating member also in the circuit and having a slip-off connection with both the contact member and the shutter which latter it is adapted to open and hold open while it is still engaging the contact member as a switch.

3. In a photographic camera, the combination with an object illuminating device, an electric circuit including the same, and a contact member in said circuit, of a shutter, a shutter operating lever, also in the circuit, a link pivoted to the lever and having a slip-off engagement with the shutter permitting it to release the latter and return idly, a projection on the lever arranged to engage the contact member during the actuation of the shutter and close the circuit and a spring normally operating to hold the link against the projection on the lever as a stop defining its shutter engaging position.

4. In a photographic camera, the combination with a support having a fixed abutment, a shutter leaf pivoted to the support and provided with an eccentric abutment and means tending to move the leaf to closed position, of an operating lever for the shutter leaf and a yielding link pivoted thereto and having a cam surface adapted, during the operative movement of the lever, to first engage the projection on the leaf and move the latter to open position and to then be deflected by the fixed abutment and release the leaf.

WILLIAM F. FOLMER.

Witnesses:
 RUSSELL B. GRIFFITH,
 AGNES NESBITT BISSELL.